US012703606B2

(12) United States Patent
Herkel

(10) Patent No.: US 12,703,606 B2
(45) Date of Patent: Aug. 11, 2026

(54) SAFETY CONTROL DEVICE

(71) Applicant: Otis Elevator Company, Farmington, CT (US)

(72) Inventor: Peter Herkel, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1296 days.

(21) Appl. No.: 17/534,991

(22) Filed: Nov. 24, 2021

(65) Prior Publication Data

US 2022/0332542 A1 Oct. 20, 2022

(30) Foreign Application Priority Data

Apr. 14, 2021 (EP) .................................... 21168320

(51) Int. Cl.

*B66B 5/02* (2006.01)
*B66B 1/30* (2006.01)
*B66B 1/32* (2006.01)

(52) U.S. Cl.

CPC .................. *B66B 5/02* (2013.01); *B66B 1/30* (2013.01); *B66B 1/32* (2013.01); *B66B 5/027* (2013.01)

(58) Field of Classification Search

CPC .... B66B 5/02; B66B 1/30; B66B 1/32; B66B 5/027; B66B 1/343; B66B 5/0018; B66B 5/0031

See application file for complete search history.

(56) References Cited

U.S. PATENT DOCUMENTS

2025/0136410 A1* 5/2025 Tenhunen ................. B66B 5/02

FOREIGN PATENT DOCUMENTS

| | | | | |
|---|---|---|---|---|
| DE | 112015006623 B4 * | 3/2021 | | B66B 5/0018 |
| DE | 112015005972 B4 * | 12/2021 | | B66B 5/0031 |
| EP | 1864935 A1 | 12/2007 | | |
| EP | 2634129 A2 | 9/2013 | | |
| WO | WO-2011111223 A1 * | 9/2011 | | B66B 5/0031 |
| WO | WO-2020056701 A1 * | 3/2020 | | B66B 13/22 |

OTHER PUBLICATIONS

European Search Report for application EP 21168320.6, Oct. 1, 2021, 40 pages.

* cited by examiner

*Primary Examiner* — Eduardo Colon Santana
(74) *Attorney, Agent, or Firm* — CANTOR COLBURN LLP

(57) ABSTRACT

A safety control device (1) for a people conveyor (101) includes a first safety control channel (2) configured to output a first safety control signal in response to one or more input signals (10, 12, 14). A second safety control channel (4) is configured to output a second safety control signal in response to one or more input signals (10, 12, 14). An override control channel (6) is configured to monitor a health of the first and second safety control channels (2, 4) and determine whether a fault has occurred in either of the first or second safety control channels (2, 4). The override control channel (6) is configured to override the first or second safety control signal in response to a determination that a fault has occurred in the corresponding safety control channel (2, 4). The override prevents activation of one or more safety systems.

15 Claims, 2 Drawing Sheets

SAFETY CONTROL DEVICE

FOREIGN PRIORITY

This application claims priority to European Patent Application No. 21168320.6, filed Apr. 14, 2021, and all the benefits accruing therefrom under 35 U.S.C. § 119, the contents of which in its entirety are herein incorporated by reference.

TECHNICAL FIELD

This disclosure relates to a device and method for controlling one or more safety systems, for example those of a people conveyor.

BACKGROUND

Modern people conveyors (e.g. elevators) typically have one or more in-built safety systems arranged to activate when the people conveyor develops a fault in order to protect its users. By way of example, typical safety systems may be arranged to disconnect a drive system (e.g. motor) of a people conveyor in order to prevent further motion being imparted to the conveyor (sometimes referred to as 'Safe Torque Off'), and/or to engage one or more emergency brakes in order to bring the people conveyor to a halt and hold it in place (sometimes referred to as 'Safe Brake Control'). These safety systems are used in order to protect the users of the people conveyors, as well as to prevent damage to the people conveyor itself.

People conveyors are typically equipped with a variety of sensors, encoders, etc. arranged to monitor various operational parameters of the people conveyor e.g. position, speed, acceleration, elevation, temperature, level of vibration, door open status, etc. Typical safety systems monitor the outputs of such sensors in real time in order to determine whether the people conveyor is functioning correctly, and thereby determine whether the safety systems should be activated. This is typically implemented through a safety control channel. The safety control channel typically includes a processor (e.g. microprocessor, microcontroller unit, FPGA, etc.) which receives the outputs from various sensors and/or other systems (e.g. an elevator controller) and is programmed to control the operation of one or more safety systems in response.

It is important that safety systems in people conveyors are tolerant of malfunctions, i.e. that they continue to operate as intended in the case of an internal failure. If a safety control channel fails to activate a safety system when required, it is possible that serious harm can occur to users of the people conveyor and/or damage may occur to the people conveyor itself. As a result of this, some safety systems employ multiple safety control channels configured to operate independently and in parallel so as to create redundancy in the system. If one channel fails, another channel can still activate the safety system appropriately.

However, the use of multiple independent safety control channels operating in parallel can be costly and power-inefficient. Each additional channel requires extra components, some of which are expensive (e.g. microcontroller units). Furthermore, adding extra safety control channels increases the space required (e.g. on a printed circuit board (PCB) or system-on-chip (SoC)) to fit the additional components. For example, adding a third parallel safety control channel would add about 50% to the component cost as well as increasing the overall size and power draw.

In the case of an internal malfunction in a channel, the channel will normally operate in a fail-safe manner to activate the safety system, e.g. to engage a brake and/or remove power from a drive mechanism. Increasing the number of channels increases the probability of a channel malfunction and therefore increases the probability that the safety systems are activated due to a channel malfunction. This can be inconvenient and reduces the availability of the system. Further logic may be introduced to combine the outputs of the multiple channels so as to reduce this effect. However, as described above, such additional logic may be costly and space-inefficient.

SUMMARY

According to a first aspect of the present disclosure there is provided a safety control device for a people conveyor, comprising: a first safety control channel configured to output a first safety control signal in response to one or more input signals; a second safety control channel configured to output a second safety control signal in response to one or more input signals; and an override control channel configured to: monitor the health of the first and second safety control channels; determine whether a fault has occurred in either of the first or second safety control channels; override the first or second safety control signal in response to a determination that a fault has occurred in the corresponding safety control channel.

According to a second aspect of the present disclosure there is provided a method of controlling one or more safety systems of a people conveyor, the method comprising: outputting a first safety control signal by a first safety control channel in response to one or more input signals; outputting a second safety control signal by a second safety control channel in response to one or more input signals; monitoring the health of the first and second safety control channels; determining whether a fault has occurred in either of the first or second safety control channels; and overriding the first or second safety control signal in response to a determination that a fault has occurred in the corresponding safety control channel.

According to a third aspect of the present disclosure there is provided a non-transitory computer readable medium comprising instructions configured to cause a safety control device to operate in accordance with the method above.

In some examples, the same input signals are received by the first and second safety control channels. In some examples each input signal is provided in parallel to each of the first and second safety control channels. It will be appreciated that if more than two safety control channels are provided, each input signal may be provided in parallel to each safety control channel. The one or more input signals may indicate one or more operational parameters of the people conveyor. For example, in an elevator system, the input signals may indicate a position, a speed, an acceleration, a vibration signature, a temperature signal, smoke detection signal, safety chain signal, etc. In an escalator system, the input signals may indicate a position, a speed, an acceleration of the steps and/or of the handrail, a temperature, etc. The one or more input signals may comprise one or more discrete input signals and a Controller Area Network (CAN) bus. The discrete input signals may be output by one or more sensors, encoders, etc. included in the people conveyor. The discrete signals can be direct analogue electric signals that may be input directly to a pin of a microcontroller. The CAN bus allows a broader range of operational conditions and/or parameters to be provided digitally to the microcontroller.

In some examples, the first and second safety control signals are configured to control the operation of one or more safety systems of the people conveyor. Examples of safety control systems include a brake control system and a drive control system.

The two safety control channels in parallel are more robust than a single safety control channel as failure of one channel still leaves the other channel fully operational and able to operate the safety control system. Total failure only occurs when both the first and second channels fail, but this is highly unlikely.

When a safety control channel fails it can either fail with its output indicating that the safety system should be activated or it can fail with its output indicating that the safety system should not be activated. The latter state is dangerous as inputs that indicate an unsafe state of the people conveyor may not result in that channel activating the safety system. This is why the second safety control channel is added, so that a redundant system is in place as a backup. However, the former state (safety control channel fails with its output indicating that the safety system should be activated) is also inconvenient as it results in the safety system being engaged when the only malfunction is in one of the two safety control channels. A particular inconvenience in elevator systems is that halting the elevator between floors can result in passengers becoming trapped in the elevator until a rescue operation can be carried out.

The override control channel of the present disclosure monitors the health of the two safety control channels and identifies any faults that occur therein. If the override control channel detects a fault, it is able to override the safety control signal output by the detected faulty channel thereby preventing activation of one or more safety systems. In other words the override control channel can force the output of the faulty channel to an "on" or "normal" state, i.e. the state that represents normal safe operation of the people conveyor system. The operation of the override control channel is significantly less complex than the operation of a full safety control channel, and as a result the override control channel may comprise fewer, more power-efficient, and cheaper components. For example, the override control channel does not need to receive and monitor all of the analogue and/or digital inputs that the main channels receive (and can therefore be a smaller device), nor does the override channel need to monitor and/or evaluate those inputs and therefore it can be a less complex processing device. In some examples the override control channel may comprise a comparatively cheap, low-powered microprocessor, whereas the first and second safety control channels may each comprise a more expensive and powerful microcontroller unit in order to execute their more complex functions. In some examples, the override control channel comprises a 14-pin microprocessor, and the first and second safety control channels each comprise a 144-pin microcontroller unit.

In some examples, the override control channel is configured to monitor the health of the first and second safety control channels by periodically instructing the safety control channels to perform one or more tasks and to monitor a response from that safety control channel. This is sometimes referred to as the challenge-response method, and thus the override control may be configured to monitor the health of the first and second safety control channels using the challenge-response method. Additionally, or alternatively, the override channel can monitor one or more debug outputs from each safety control channel to check for proper operation of the safety control channel. Examples of tasks that may be instructed by the override control channel in order to monitor the health of the safety control channels may include a simple request for response, a request for a value of one of the inputs, or a mathematical calculation to perform or a problem to solve. It will be appreciated that these are simply given by way of example. A correct response from the microcontroller of the safety control channel would indicate that the microcontroller is functioning and that the safety control channel can be considered healthy. An incorrect response or a lack of response would indicate a fault in the microcontroller and that the corresponding safety control channel is unhealthy/malfunctioning. In the case of requesting the value of an input, the override controller can request the same value from both channels and compare the results. If the results differ by more than an acceptable amount then a fault may have occurred. The microcontrollers may be arranged to output a debug signal to the override control channel at various stages in a normal processing loop, e.g. discrete inputs read successfully, serial input (e.g. CAN bus) read successfully, evaluation of inputs completed successfully, output set successfully, etc. The override control channel may check, for example, based on the debug signals, whether program flow is being performed in the correct order, whether program flow is being carried out in a timely manner, or whether the microprocessors of the first and second channels are operating in the same manner (e.g. providing the same outputs and/or providing outputs in the same order and/or providing outputs sufficiently in sync, allowing or a degree of normal jitter). If signals are not received in the correct order, or if outputs are delayed more than a certain amount (which may be an absolute amount or an amount relative to the other controller, or both) then the corresponding safety control channel may be considered to be unhealthy/malfunctioning.

In some examples, the override control channel is configured to monitor the health of the entirety of the first and second control channels. For example, if a fault (e.g. a loss of signal) occurs on an input line to the microcontroller of one safety control channel, the override control channel may be able to detect the fault by comparing the values of the input signals in each channel. This may be done directly, e.g. before the signals reach the microcontrollers. Alternatively, the override control channel may determine whether the microcontroller is successfully able to receive the expected signal—e.g. through comparison with the signal received via the equivalent input for the microcontroller of the other safety control channel. This comparison may be done through the microcontrollers themselves.

In some examples, the override control channel is configured to monitor the health of one or more portions of the first and second safety control channels. For example, the override control channel may monitor one or more components or sub-circuits of the first and second safety control channels. The microcontroller may be one portion of a safety control channel. The override control channel may directly monitor the health of the one or more portions (e.g. where the override control channel is directly coupled to the one or more portions), or the override control channel may indirectly monitor the health of the one or more portions (e.g. via monitoring of the microprocessors of the first and second safety control channels). In some examples, the override control channel is configured to monitor the health of the microcontrollers of the first and second safety control channels only. By having the override control channel monitor the health of the microcontrollers only, the number of input pins required by the override control channel may be kept to a minimum. This may help enable the use of a small, cheap and low-powered microprocessor in the override control channel.

In some examples, the override control channel is coupled to the first and second safety control channels via a serial communication line. As only simple instructions and debug signals are transmitted between the override control channel and the two safety control channels, a serial communication line may be sufficient to facilitate communication between the safety control channels and the override control channel. Further, a serial communication line means that the override controller can be a small microprocessor with few pins, thereby keeping its cost low.

In some examples, the first and second safety control channels are further configured to monitor the health of the override control channel; determine whether a fault has occurred in the override control channel; and deactivate the override control channel in response to a determination that a fault has occurred in said channel. A faulty override control channel could be problematic for the safety device. For example it could incorrectly override one or both of the safety control signal outputs, thereby preventing a real safety signal from activating the safety control systems. Having the two safety control channels monitor the health of the override control channel, and deactivate the channel based on a determination that a fault has occurred, reduces the likelihood of this occurring. The monitoring of the override channel may be similar to the monitoring described above for the main channels, e.g. requesting simple tasks to be completed or monitoring debug outputs for correct operation.

In some examples, the first and second safety control channels are configured, in response to a determination that a fault has occurred in the override control channel, to enable the people conveyor to operate as normal and optionally provide an output indicating that a fault has occurred in the override control channel. When the override control channel is not operational, the system simply functions as a standard two-channel redundant safety system, which is already considered sufficiently safe for the people conveyor to function normally, as the two safety control channels provide redundant safety control. It may therefore only be necessary to flag that the override control channel is faulty e.g. to a maintenance worker or service department in order to allow repairs to be made at a convenient time. Thus, the availability of the elevator system is not compromised during this period until suitable repair can be made.

In some examples the override control channel is configured to override the first or second safety control signal on a temporary basis or for a predefined period of time. The override control channel may be configured to temporarily override the first or second control signal until the people conveyor is positioned such that any users thereof may safely disembark. For example, in the case of an elevator system, the override may last long enough to move the elevator car to the next floor (or to the requested destination floor) in order to allow passengers to disembark safely, without getting trapped in the elevator car. The override control channel may be configured to override the first or second safety control signal for a time period of no more than a predetermined period of time, thus placing a limit on the time during which the system operates without two full redundant safety channels. In some examples, the override control channel may be configured to override the first or second safety control signal for a time period of no more than thirty seconds, or one minute, or two minutes, or five minutes. In some examples, it may be considered safe enough to operate the system with one main channel and the override channel for an hour or a few hours so as to provide continued availability of the service until repairs can be made. During this period when the override control channel is overriding the output of the faulty control channel, the override control channel still provides a level of redundancy as it still controls the output of the faulty control channel. If an input to the remaining safety control channel indicates that the safety control system(s) should be activated, that control channel notifies the override control channel so that the override signal can be removed from the faulty control channel. In this way, two output signals are still provided and used to activate the safety control system(s). Only one of these output signals is required to activate the safety control system(s), so the required redundancy is still provided.

During this period when the override control channel is overriding the output of the faulty safety control channel, it is possible (although quite unlikely) that the remaining safety control channel will also develop a fault. If this occurs, the override control channel can detect the fault in that channel and, knowing that both safety control channels are now faulty, can immediately remove its override signal from the faulty channel. Providing at least one of the faulty safety control channels has failed to a state in which its output triggers the safety control systems, the safety control systems will be activated. In some examples, the override channel may be arranged, in this scenario, to override one or both of the safety control channel outputs to force them to a safe state, i.e. a state in which they should both activate the safety control system(s).

In some examples, the first safety control channel is configured to output the first safety control signal in order to control the operation of a first safety switch, and the second safety control channel is configured to output the second safety control signal in order to control the operation of a second safety switch. The first safety control channel may comprise a first microcontroller unit configured to output the first safety control signal to a first output circuit configured to control the operation of the first safety switch. The second safety control channel may comprise a second microcontroller unit configured to output the second safety control signal to a second output circuit configured to control the operation of the second safety switch. The first microcontroller unit may be coupled to the second microcontroller unit in order to enable communication between the first and second safety control channels. The first and second output circuits may be used to convert the low voltage signal from the microcontroller into a suitable drive signal for the safety control system. For example, a safety brake system may operate at 48 V and a motor drive circuit may operate in the region of 600 V. Accordingly, the first and second output circuits may be used to provide suitable control at the necessary voltages based on a microcontroller input (at e.g. 5 V). Where more than one safety control system is to be controlled, the output circuit may be arranged to control all or a plurality of the safety control systems based on a single signal from the microcontroller unit. In such cases, the first output circuit may control a plurality of first safety switches (one for each safety control system) and the second output circuit may control a plurality of second safety switches (one for each safety control system).

In some examples, a safety system of the people conveyor is configured to be activated when one, or both, of the first and second safety switches are deactivated in response to the first and second safety control signals respectively. In other examples, the safety system of the people conveyor is configured to be activated when one, or both, of the first and second safety switches are activated. The safety system may comprise a 'Safe Torque Off' or a 'Safe Brake Control' safety system. As discussed above, both of these safety systems may be used and controlled simultaneously.

In some examples, the first and second safety switches are connected in series and configured such that, when both of the safety switches are activated, they: activate an electromagnet configured to prevent mechanical activation of one or more brakes of the people conveyor, or activate a drive system of the people conveyor, enabling it to impart a driving force or torque to the people conveyor when controlled to do so. The safety switches being connected in this manner enables the outputs of the first and second safety control channels to act in a redundant manner: if either one of the outputs deactivates its associated safety switch using its associated safety control signal, the associated safety system is thereby activated.

In some examples, the first and second safety switches each comprise a transistor. The transistor may be suitably sized and designed for the voltage of the safety system that it is to control.

In some examples, the people conveyor is an elevator system. In such cases the safety brake control system may be a brake applied to the drive machine or it may be safety brakes on the elevator car itself. The safe torque off system may disconnect the drive control signals from the drive machine so as to prevent torque being applied.

BRIEF DESCRIPTION OF THE DRAWINGS

Certain preferred examples of this disclosure will now be described, by way of example only, with reference to the accompanying drawings in which.

DETAILED DESCRIPTION

Figure 1:
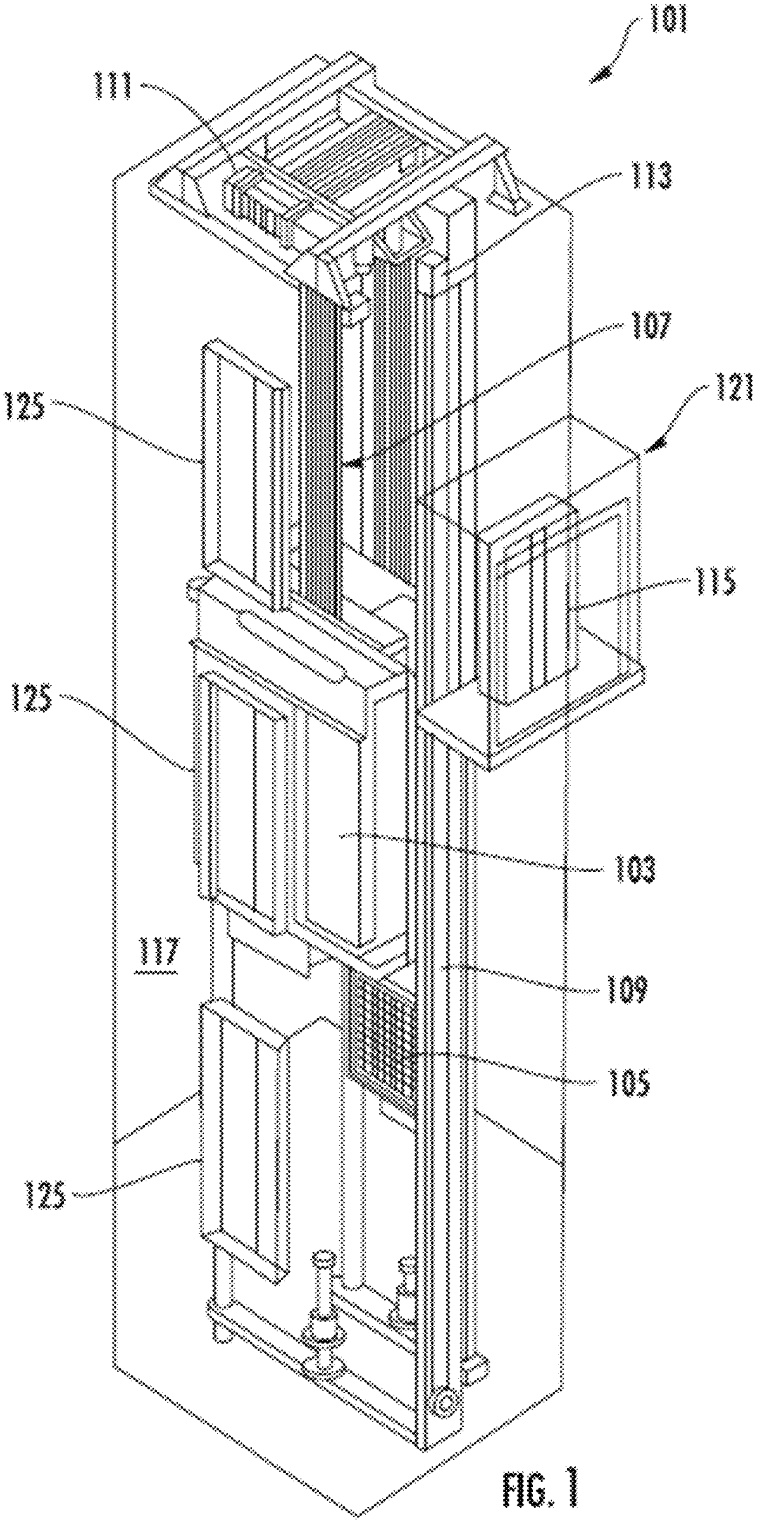
FIG. 1 is a schematic illustration of an elevator system according to examples of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counterweight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, levelling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor or pinched wheel propulsion to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable to conveyance systems such as an elevator system 101 and a conveyance apparatus of the conveyance system such as an elevator car 103 of the elevator system 101. In another example, embodiments disclosed herein may be applicable to conveyance systems such as an escalator system and a conveyance apparatus of the conveyance system such as a moving stair of the escalator system.

Figure 2:
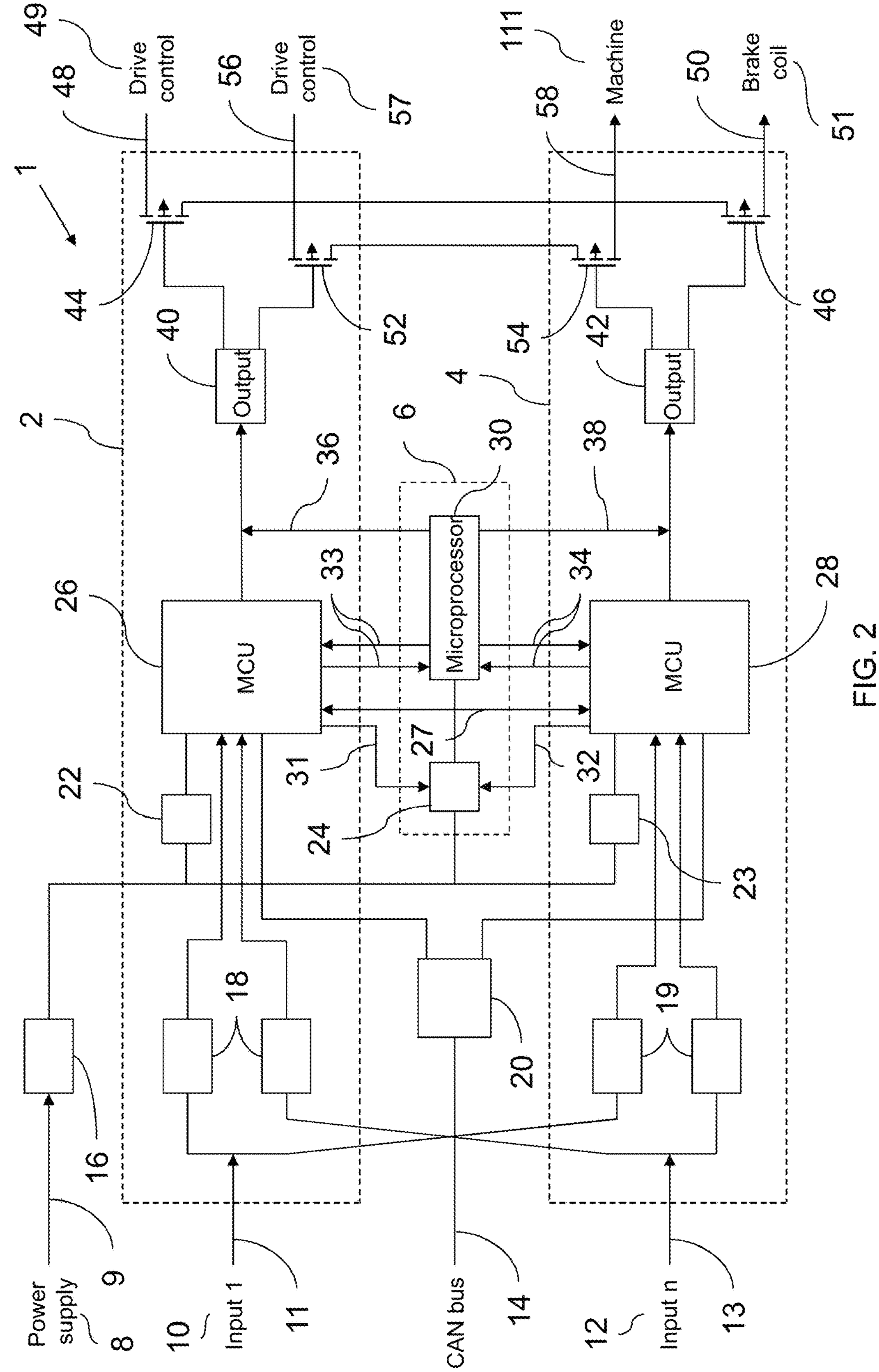
FIG. 2 is a schematic diagram illustrating a safety control device according to an example of the present disclosure.

FIG. 2 shows a safety control device 1 for a people conveyor. In this example, the safety control device 1 is for an elevator system such as the elevator system 101 shown in FIG. 1, though it will be appreciated that the safety control device 1 is suitable for any conveyance system as described above. In this example, the safety control device 1 may be the final node in a chain of elevator safety systems.

The safety control device 1 comprises a first safety control channel 2, a second safety control channel 4, and an override control channel 6. The first safety control channel 2 comprises a first microcontroller unit (MCU) 26 configured to control the operation of two safety switches 44 and 52 in response to a number of input signals indicating one or more operational parameters of the elevator system 101. The second safety control channel 4 is operationally identical to the first safety control channel 2 and comprises a second MCU 28 configured to control the operation of two safety switches 46 and 54 in response to a number of input signals indicating one or more operational parameters of the elevator system 101. The same input signals are fed to both the first and second safety control channels 2 and 4, thereby allowing both safety control channels 2, 4 to independently determine whether the elevator system 101 is operating correctly, and to control the operation of the respective safety switches 44, 52 and 46, 54 in response to determining that the elevator system 101 is not operating correctly.

The first safety control channel 2 comprises two input level converters 18, a first power supply voltage converter 22, a first MCU 26, first output circuitry 40, and two safety switches 44 and 52, which in this example are metal-oxide-semiconductor field-effect-transistors (MOSFETs). The second safety control channel 4 comprises two input level converters 19, a second power supply voltage converter 23, a second MCU 28, second output circuitry 42, and two safety switches 46 and 54, which in this example are also MOSFETs. The override control channel comprises a power supply voltage converter 24 and a microprocessor 30. The number of input level converters 18 and 19 provided for the respective safety control channels 2 and 4 is not limited to two as shown in this example, but may be any number dependent upon the number of input signals that are provided to the safety control channels 2 and 4. In this example, the MCUs 26 and 28 of the first and second safety control channels 2 and 4 comprise one hundred and forty four pin MCUs, and the microprocessor 30 of the override control channel 6 comprises a fourteen pin microprocessor. The MCUs 26 and 28 and the microprocessor 30 are not limited to one hundred and forty-four pins and fourteen pins respectively as in this example, but may comprise any suitable size. However, it is advantageous that the microprocessor 30 of the override channel 6 can be smaller and have fewer pins than the MCUs 26, 28 so that it can be less costly. The transistors 44, 46, 52 and 54 are not limited to MOSFETs as in this example, but may comprise any suitable type of transistor e.g. MOSFET, PMOS, NMOS, BJT, NPN, PNP, etc.

A power supply 8 (e.g. from the electricity grid or from a generator or battery) is fed via a power supply input 9 to a power supply voltage regulator 16 which outputs a regulated DC supply voltage at a suitable voltage level (e.g. 12V) to two 3.3V voltage converters 22 and 23 and a 1.8V voltage converter 24. The output of the 3.3V voltage converter 22 supplies power to the MCU 26 of the first safety control channel 2, the output of the 3.3V voltage converter 23 supplies power to the MCU 28 of the second safety control channel 4, and the output of the 1.8V voltage converter 24 supplies power to the microprocessor 30 of the override control channel 6. It will be appreciated that the voltage converters 22, 23 and 24 are not limited to producing outputs of 3.3V and 1.8V respectively, but may comprise any suitable voltage converters depending on the voltage requirements of the respectively coupled MCUs 26 & 28 and microprocessor 30, e.g. 5V, 3.3V, 1.8V, etc.

A first discrete input signal 10 is fed via a first input 11 to one of the input level converters 18 of the first safety control channel 2 and to one of the input level converters 19 of the second safety control channel 4. An $n^{th}$ discrete input signal 12 is fed via a second input 13 to the other of the input level converters 18 of the first safety control channel 2 and to the other of the input level converters 19 of the second safety control channel 4.

In this example, two discrete input signals 10 and 12 are shown for the sake of simplicity, however it will be appreciated that the number of discrete input signals provided to the two safety control channels 2 and 4 is not limited to two as shown in this example, but may be any number, and each of the safety control channels 2 and 4 may comprise an input level converter 18, 19 for each input signal 10, 12. The discrete input signals 10 and 12 comprise analogue signals output by sensors within the elevator system 101—e.g. temperature sensors, accelerometers, vibration sensors, light sensors, encoders, etc.

The input level converters 18 and 19 are configured to convert the discrete input signals 10 and 12 to operational voltage levels that can be received and analysed by the MCUs 26 and 28. Each of the outputs of the input level converters 18 are fed to input pins of the MCU 26 of the first safety control channel 2, and each of the outputs of the input level converters 19 are fed to input pins of the MCU 28 of the second safety control channel 4. The input level converters 18, 19 may be voltage transformers that may convert a current input into a voltage input or they may be analogue to digital converters or digital to analogue converters as required.

The safety control device 1 further comprises a Controller Area Network (CAN) bus 14, coupled to a CAN bus interface 20, which is in turn coupled to the MCUs 26 and 28. The CAN bus 14 enables the MCUs 26 and 28 to communicate with the MCUs and microprocessors of other systems (e.g. safety nodes) of the elevator system 101 (not shown). Digital signals are sent and received by the MCUs 26 and 28 over the CAN bus 14, enabling the MCUs 26 and 28 to receive information from other systems of the elevator system 101 as well as transmit information to other systems of the elevator system 101. Information such as whether a brake of the elevator system 101 is engaged, whether a driving motor of the elevator system 101 is engaged, the current position, speed and/or acceleration of the elevator, etc. may be received by the MCUs 26 and 28 via the CAN bus 14. These inputs supplement the discrete inputs 10, 12 and all inputs can be processed together within the MCUs 26, 28.

The MCU 26 of the first safety control channel 2 is configured to analyse the discrete input signals 10, 12 and the CAN bus signals 14 in order to determine whether the elevator system 101 is operating correctly, and accordingly whether any safety mechanisms of the elevator system 101 should be activated, and to output a safety control signal to the output circuit 40 dependent upon this determination. The output circuit 40 is arranged to output two switch control signals in response to the safety control signal received from the MCU 26: the first switch control signal is provided to the gate terminal of a first 'Safe Brake Control' (SBC) MOSFET 44, and the second switch control signal is provided to a first 'Safe Torque Off' (STO) MOSFET 52. The switch control signals output by the output circuit 40 therefore determine whether the first SBC MOSFET 44 and the first STO MOSFET 52 allow current to flow across their respective source and drain terminals.

Similarly, the MCU 28 of the second safety control channel 4 is configured to analyse the discrete input signals 10, 12 and the CAN bus signals 14 in order to determine whether the elevator system 101 is operating correctly in the same way as the MCU 26, and to output a safety control signal to the output circuit 42 dependent upon this determination. The output circuit 42 is arranged to output two switch control signals in response to the safety control signal received from the MCU 28: the first switch control signal is provided to the gate terminal of a second SBC MOSFET 46, and the second switch control signal is provided to the gate terminal of a second STO MOSTFET 54. The switch control signals output by the output circuit 42 therefore determine whether the second SBC MOSFET 46 and the second STO MOSFET 54 allow current to flow across their respective source and drain terminals.

The MCUs 26 and 28 may be coupled to (or may contain) a memory (not shown) containing logic instructions that, when executed by the MCUs 26 and 28, cause the MCUs 26 and 28 to analyse the input signals 10, 12 and 14 in order to determine whether the elevator system 101 is functioning correctly.

The output circuits 40 and 42 are provided because the operating output voltage ranges of the MCUs 26 and 28 are too small relative to the required operating voltage ranges to control the SBC and STO MOSFETs 44, 46, 52 and 54. Furthermore, the SBC MOSFETs 44 and 46 require different operating voltage ranges to the STO MOSFETs 52 and 54. The output circuits 40 and 42 take the control signals output by the MCUs 26 and 28 as inputs (typically at around 3.3 V), and output switch control signals within the required operating voltage ranges for the MOSFETs 44, 46, 52 and 54 (for example at 48 V or 600 V), thereby allowing the MCUs 26 and 28 to control the operation of the MOSFETs 44, 46, 52 and 54.

The first and second SBC MOSFETs 44 and 46 are used to control a 'Safe Brake Control' safety mechanism of the elevator system 101. When both SBC MOSFETs 44 and 46 are enabled (i.e. the voltage at their gate terminals output by the respective output circuits 40 and 42 enables current to flow across their respective source and drain terminals), current is allowed to flow from an SBC drive control input 48 to a brake coil output 50. The SBC drive control input 48 is coupled to an output of a drive control system 49 of the elevator system 101 which provides a constant voltage supply to the SBC drive control input 48.

The SBC brake coil output 50 is coupled to a brake coil 51 of the elevator system 101. The brake coil 51 is configured to prevent the brakes of the elevator system 101 from being engaged whilst it is supplied with current. In this example, the brakes of the elevator system 101 are mechanically configured to constantly apply (e.g. by a spring) a braking force in order to slow and stop the movement of an elevator car. The brake coil 51 is configured, when current is applied thereto, to apply a counteracting force to this mechanical braking force, thereby releasing the brakes and allowing the elevator to move. When a current is not applied to the brake coil 51, the counteracting force is removed and the elevator brakes are consequently engaged.

The first and second SBC MOSFETs 44 and 46 must therefore both be enabled in order for current to be supplied to the brake coil 51, thereby releasing the brakes of the elevator system 101 and enabling the elevator car to move. If either one, or both, of the safety control channels 2 or 4 disables their respective SBC MOSFETs 44 or 46 in response to one or more of the input signals 10, 12 or 14, the brakes of the elevator system 101 are engaged thereby stopping movement of the elevator car as a safety precaution.

The first and second STO MOSFETs 52 and 54 are used to control a 'Safe Torque Off' safety mechanism of the elevator system 101. When both STO MOSFETs 52 and 54 are enabled, current is allowed to flow from an STO drive control input 56 to a machine output 58. The STO drive control input 56 is coupled to a second output of a drive control system 57 of the elevator system 101 which provides a constant voltage supply to the STO drive control input 56.

The STO machine output 58 is coupled to the machine 111 of the elevator system 101. The machine 111 is configured to only apply a driving force or torque to the elevator system 101 when it receives a current from the STO machine output 58. When no current is received from the STO machine output 58, the machine 111 is prevented from applying a force or torque in order to drive movement of the elevator system 101. In some examples, the STO machine output 58 is coupled directly to a power supply input of the machine 111. In other examples, the STO machine output 58 is coupled to a control input of the machine 111.

The first and second STO MOSFETs 52 and 54 must therefore both be enabled in order for current to be supplied to the machine 111, thereby enabling the application of force or torque by the machine 111 in order to drive movement of the elevator system 101. If either one, or both, of the safety control channels 2 or 4 disable their respective STO MOSFETs 52 or 54 in response to one or more of the input signals 10, 12 or 14, the machine 111 is prevented from driving movement of the elevator system 101.

It will be appreciated that the brake control safety circuit and drive safety control circuit could equally be arranged to enable normal operation of the elevator system 101 when no current is supplied to the brake coil 51 or machine 111 respectively (i.e. the circuits are arranged to activate an associated safety system by supplying a current to the system rather than by preventing a current supply as in the previous example). For example, the brake control safety circuit could be arranged to energise the coil 51 in order to apply the brakes in response to a safety event and the drive safety control safety circuit could be arranged to disable the machine 111 by supplying a current thereto. In such cases, the two switches 44 and 46, or 52 and 54, could be connected in parallel instead of in series so as to provide the required redundancy, as the activation of either, or both, parallel switches would then supply a current to the relevant safety system in order to activate it.

The first and second safety control channels 2 and 4 operate in a parallel manner, with the MCUs 26 and 28 of both channels independently analysing the input signals 10, 12 and 14 in order to determine whether the elevator system 101 is operating correctly. If either one of the channels 2 or 4 detects a fault, it disables its associated SBC MOSFET 44, 46 and/or STO MOSFET 52, 54, thereby activating one or both of the SBC or STO systems, bringing the elevator to a halt and preventing further damage to the system or occupants of an elevator car. This two channel setup of the safety control device 1 increases the reliability of the system: in the event that one of the safety channels 2 or 4 malfunctions and does not detect a fault in the system based on the input signals 10, 12 and 14 when a fault has occurred, it is very likely that the other safety channel 2 or 4 will detect the fault and activate the safety systems of the elevator. It is very unlikely that both safety channels 2 and 4 will malfunction simultaneously and that both fail to detect a fault in the elevator system 101.

However, if one of the safety control channels 2 or 4 malfunctions as a result of e.g. a component failure, a fault in an electrical connection, an MCU logic fault, etc., it is possible that the faulty channel will deactivate one or both of its associated SBC or STO MOSFETs 44, 46, 52 or 54 and activate the associated safety mechanism when no fault has occurred in the elevator system 101. Consequently an emergency stop is performed and there is a risk that any occupants of an elevator car will become entrapped as the car may be caused to come to a halt between two floors where it is not possible for the occupants to disembark. Furthermore, it is possible that the activation of any safety systems could cause unnecessary harm to any occupants of the elevator, or the elevator itself, as a result of sharp deceleration caused by brake activation or motor deactivation. Therefore an override control channel 6 is provided in order to monitor the health of the two safety control channels 2 and 4 and temporarily override their output signals if an internal fault in one of the safety channels 2, 4 is detected.

The override control channel 6 comprises a microprocessor 30 configured to monitor the health, function and/or operation of the first and second safety control channels 2 and 4 in order to determine whether a fault has occurred in either channel. The microprocessor 30 is powered by the 1.8V power supply voltage converter 24. The microprocessor 30 is coupled to the MCU 26 of the first safety control channel 2 via the serial communication connections 33, and to the MCU 28 of the second safety control channel 4 via the serial communication connections 34. This serial connections between the microprocessor 30 and the MCUs 26 and 28 enable the microprocessor 30 to communicate with the MCUs 26 and 28. The microprocessor 30 is configured to send instructions via the serial communication connections 33 and 34 to the MCUs 26 and 28 respectively, and to receive responses provided by the MCUs 26 and 28. The connections 33 and 34 between the microprocessor 30 and the MCUs 26 and 28 are not limited to being serial communication connections as in this example, but may comprise any suitable connection enabling transmission and reception of instructions and information between the microprocessor 30 and the MCUs 26 and 28. However, serial connections can be made with a single pin and are sufficient for the communications required here. This allows the size and cost of the microprocessor 30 to be minimised.

Additionally, the MCUs 26 and 28 are coupled together via a serial communication connection 27 thereby enabling the two MCUs 26 and 28 to transmit and receive instructions and information between one another. The connection 27 between the MCUs 26 and 28 is not limited to a serial communication connection as in this example, but may comprise any suitable connection enabling transmission and reception of instructions and information between the MCUs 26 and 28. This connection 27 may be used for mutual health and status monitoring. For example, one MCU 26, 28 can notify the other MCU 26, 28 if it has detected a safety scenario that requires action, thereby allowing the other MCU 26, 28 to decide whether or not to take action too.

The MCU 26 of the first safety control channel 2 is coupled to the power supply voltage converter 24 of the override control channel 6 via a shut off control line 31, and the MCU 28 of the second safety control channel 4 is coupled to the power supply voltage converter 24 of the override control channel 6 via a shut off control line 32. The MCUs 26 and 28 are therefore able to enable and disable the microprocessor 30, and therefore the override control channel 6, using the shut off control lines 31 and 32 respectively. This may be useful where either MCU 26, 28 detects an internal fault in the override channel 6.

The microprocessor 30 is also coupled to the outputs of the MCUs 26 and 28 via the override lines 36 and 38 respectively. The override lines 36 and 38 enable the microprocessor 30 to override the safety control signals output by the MCUs 26 and 28. For example, the microprocessor 30 may use the override lines 36, 38 to 'force on' the output of the respective MCU 26, 28, e.g. by setting the voltage on that line to high. This has the same effect on output circuits 40, 42 as if the respective MCU 26, 28 had output a high signal indicating normal operation. It will of course be appreciated that in examples where a low signal indicates normal operation than the override lines 36, 38 may 'force off' the respective outputs instead.

The microprocessor 30 of the override control channel 6 is configured to monitor the health of the first and second safety control channels 2 and 4 over the serial connections 33 and 34 to the MCUs 26 and 28 respectively. The microprocessor 30 may be coupled to a memory (not shown) containing logic instructions that, when executed by the microprocessor 30, cause the microprocessor 30 to monitor the health of the first and second safety control channels 2 and 4.

The microprocessor 30 in this example is configured to monitor the health of the first and second safety control channels 2 and 4 by transmitting instructions to the MCUs 26 and 28 over the serial communication connections 33 and 34 respectively that cause the MCUs 26 and 28 to perform simple tasks. The MCUs 26 and 28 then perform the instructed tasks and return results to the microprocessor 30 over the serial communication connections 33, 34. The microprocessor 30 then checks the result and if the result is incorrect or if no reply was received then the microprocessor 30 determines that a fault has occurred in that MCU 26, 28. The microprocessor 30 can also be arranged to receive debug signals from each of the MCUs 26, 28 at each stage of the normal processing cycle of the MCU 26, 28. These debug signals can also be received by the microprocessor 30 over the serial communication connections 33 and 34 respectively. The microprocessor 30 is configured to receive and analyse the debug signals that it receives from the MCUs 26 and 28 in order to determine if a fault has occurred in the first or second safety control channels 2 or 4. For example, the presence and/or the timing and/or the order of the debug signals may be used to check for correct operation. If debug signals are not received, or are received in the wrong order, or are received with unusual delays, then the microprocessor 30 can determine that there is a fault in the respective MCU 26, 28. The microprocessor 30 can also compare the order and the timing of the debug signals received from the two MCUs 26, 28. In normal operation, the two MCUs 26, 28 should operate substantially in synchrony as they are identical in design. Therefore any discrepancies that fall outside normal process variation and jitter may indicate a fault in one of the MCUs 26, 28.

Examples of tasks that may be transmitted from the microprocessor 30 to the MCUs 26 and 28 in order to monitor the health of the safety control channels 2 and 4 may include: a simple request for response, a request for a value of one of the inputs (e.g. a discrete input or a value from the CAN bus 14), or a mathematical calculation to perform or a problem to solve. Debug signals received from the MCUs 26, 28 may include discrete inputs read successfully, serial input read successfully, evaluation of inputs completed successfully, output set successfully, etc. The microprocessor 30 analyses whether a fault has occurred in either of the safety control channels 2 or 4 in response to these tasks and/or debug signals. The microprocessor 30 may check, based on the response and/or debug signals whether the MCUs 26 and 28 perform calculations correctly, whether program flow is being performed in the correct order, whether instructions are being carried out in a timely manner, whether input signal readings are correct, whether output signal readings are correct, etc.

The microprocessor 30 is configured to temporarily transmit a signal over the override line 36 in order to override the safety control signal output by the MCU 26, if it detects a fault in the first safety control channel 2. Similarly, the microprocessor 30 is configured to transmit a signal over the override line 38 in order to override the safety control signal output by the MCU 28, if it detects a fault in the second safety control channel 4. In doing this, the microprocessor 30 temporarily overrides control of the MOSFETs 44 and 52 or 46 and 54 from the MCU 26 or 28, allowing the microprocessor 30 to prevent the faulty safety control channel 2 or 4 from activating the SBC or STO safety systems, i.e. preventing an emergency stop. The internal fault of one safety channel is not sufficiently severe to warrant an emergency stop while the override channel 6 can provide the necessary redundancy in control of the MOSFETs of the faulty channel. Thus the system still has a two-switch redundancy in the safety control systems even though fault detection is now reliant on a single main safety control channel. In some examples, the override channel 6 may also be arranged to provide a further level of redundancy by detecting a fault in both main safety control channels 2, 4 and forcing off the output signals on both channels 2, 4 so as to activate an emergency stop.

The time period for which the microprocessor 30 is configured to override control of the outputs of the MCU 26 or 28 may be any appropriate value in accordance with system design, regulations and safety assessments. In some examples, the microprocessor 30 is configured to receive instructions from the MCU 26 or 28 of the non-faulty safety control channel 2 or 4 over the serial communication connections 33 or 34 respectively which instruct the microprocessor 30 as to how long the output of the MCU 26 of 28 of the faulty safety control channel 2 or 4 should be overridden. In other examples it is the microprocessor 30 that is configured to determine how long to override the output of the MCU 26 or 28 of the faulty channel 2 or 4.

In some examples the microprocessor 30 is configured, whether it is using its own instructions or receiving instructions from the MCU 26 or 28 of the non-faulty safety control channel 2 or 4, to override the output of the MCU 26 or 28 of the faulty safety control channel 2 or 4 for a period of no longer than one minute. The risk of a genuine fault occurring in the elevator system 101 during the up to one minute period of override by the override control channel 6, and that fault not being detected by the non-faulty safety control channel 2 or 4, is extremely small. The risk of the non-faulty safety control channel 2 or 4 developing a fault in the up to one minute period of override by the override control channel 6 is also extremely small. For comparison, the design lifetime of the safety control channels 2, 4 is typically about twenty years.

The microprocessor 30 may be configured to override the faulty safety control channel 2 or 4 until the elevator car has reached the nearest landing floor at which any occupants may disembark. The microprocessor 30 may be configured to override the faulty safety control channel 2 or 4 until the elevator car has reached the nearest landing that would not require excessive deceleration of the elevator car, thereby avoiding discomfort and distress to the occupants of the elevator car. Alternatively, the microprocessor 30 may be configured to override the faulty safety control channel 2 or 4 until the elevator car has reached the current destination landing floor requested by the passengers.

By temporarily overriding the output of the MCU 26 or 28 of the first or second safety control channels 2 or 4 when a fault is detected therein, the override control channel 6 prevents the safety systems of the elevator system 101 from being activated inconveniently and when safety considerations do not require it, thus preventing entrapment of elevator passengers. When a fault is detected in one of the safety control channels 2 or 4, the microprocessor 30 may be configured to notify the fault to the non-faulty safety control channel 2 or 4, which can then notify the fault to other systems of the elevator system 101 via the CAN bus 14. Once the elevator system 101 has moved to a landing where occupants can disembark, further use of the elevator system 101 may be prevented until maintenance has been performed on the faulty safety control channel 2 or 4 to correct the fault. In some examples, the maintenance required may be a simple reset of the faulty safety control channel 2 or 4 or may require replacement of the safety control board. Where a reset is all that is required, this can be performed automatically and the system can be restored to operation very quickly. Such a reset is normally only performed while the elevator car is stopped and held safely at a landing and operation is not resumed until the reset has completed successfully and the system is verified as being healthy. With the override channel 6 described here, such resets can be performed on the fly, e.g. while the elevator car is moving. To do so, the override channel takes over the control of the faulty safety control channel while the reset is performed. A reset typically takes 1-2 seconds, i.e. a time period during which the chance of a fault is minimal. During this time, the override channel maintains the redundant control of the two switches of each safety system so that in the event of a fault, both redundant switches will still be triggered, thereby providing the necessary safety fallback during the reset period. This improves the availability and efficiency of the system as there is no need to stop the elevator car at a landing in order to perform the reset.

In this example, the microprocessor 30 is configured to override the output of the MCUs 26 and 28 via the override lines 36 and 38. In other examples, however, the microprocessor 30 may instead be configured to override the outputs of the output circuits 40 and 42. The override channel 6 could have its own output circuit so as to convert voltages as required.

The MCUs 26 and 28 are also configured to monitor the health of the override control channel 6 via the serial communication connections 33 and 34 respectively. The monitoring of the health of the override control channel 6 by the MCUs 26 and 28 is performed in much the same manner as the monitoring of the health of the two safety control channels 2 and 4 by the microprocessor 30, as described above. If either of the MCUs 26 or 28 detects a fault in the override control channel, it transmits a signal over the shut off control line 31 or 32 respectively in order to disable the power supply voltage converter 24 from providing power to the microprocessor 30. As a result, the override control channel 6 is disabled when one of the MCUs 26 or 28 detects a fault therein. When a fault is detected in the override control channel 6, the MCUs 26 and 28 are configured to notify the fault to other systems of the elevator system 101, e.g. via the CAN bus 14. In this example, however, use of the elevator system 101 is not prevented by the notification of a fault in the override control channel 6—instead a maintenance report is generated indicating that the override control channel 6 requires maintenance, and the elevator system 101 is configured to continue normal operation. Without the override channel 6, the remaining two safety control channels 4 and 6 provide the normal and accepted level of redundancy for normal operation, although until the override channel 6 is fixed, there will be a risk of passenger entrapment in the event of an internal fault in either of the safety control channels 2, 4.

As the functionality of the override control channel 6 is low in complexity, the microprocessor 30 is not required to be powerful. As a result, the microprocessor 30 in this example is a small fourteen pin microprocessor. This enables the override control channel 6 to be physically small, minimises the cost of including the override control channel 6 (as small low-powered microprocessors are inexpensive), and reduces the overall power consumption of the override control channel 6.

The safety control device 1 is not limited to two safety control channels and one override control channel as shown in this example, but may comprise any number of safety control channels and override channels, depending on the requirements of the elevator system 101. For example, the safety control device 1 may comprise three safety control channels and a single override control channel, four safety control channels and a single override control channel, three safety control channels and two override control channels, etc.

It will be appreciated by those skilled in the art that the invention has been illustrated by describing one or more specific examples thereof, but is not limited to these embodiments; many variations and modifications are possible, within the scope of the accompanying claims.

What is claimed is:

1. A safety control device (1) for a people conveyor (101), the safety control device (1) comprising:

a first safety control channel (2) configured to output a first safety control signal in response to one or more input signals (10, 12, 14);

a second safety control channel (4) configured to output a second safety control signal in response to one or more input signals (10, 12, 14); and an override control channel (6) configured to:

monitor a health of the first and second safety control channels (2, 4);

determine whether a fault has occurred in either of the first or second safety control channels (2, 4);

wherein the override control channel (6) is configured to override the first or second safety control signal in response to a determination that a fault has occurred in the corresponding safety control channel (2, 4), the override preventing activation of one or more safety systems.

2. The safety control device (1) of claim 1, wherein the override control channel (6) is configured to monitor the health of the first and second safety control channels (2, 4) by periodically instructing the safety control channels (2, 4) to perform one or more tasks and monitor a response from the safety control channels (2, 4) and/or monitor a debug output from each safety control channel (2, 4).

3. The safety control device (1) of claim 1, wherein the first and second safety control channels (2, 4) are further configured to:

monitor the health of the override control channel (6);

determine whether a fault has occurred in the override control channel (6); and deactivate the override control channel (6) in response to a determination that a fault has occurred in said channel (6).

4. The safety control device (1) of claim 3, wherein the first and second safety control channels (2, 4) are configured to, in response to a determination that a fault has occurred in the override control channel (6), enable the people conveyor (101) to operate as normal and flag that a fault has occurred in the override control channel (6).

5. The safety control device (1) of claim 1, wherein the override control channel (6) is configured to override the first or second safety control signal on a temporary basis or for a predefined period of time or until the people conveyor (101) is positioned such that any users thereof may safely disembark.

6. The safety control device (1) of claim 1, wherein the override control channel (6) is configured to override the first or second safety control signal for a time period of no more than one minute.

7. The safety control device (1) of claim 1, wherein the same input signals (10, 12, 14) are received by both the first and second safety control channels (2, 4), and wherein the one or more input signals (10, 12, 14) indicate one or more operational parameters of the people conveyor (101).

8. The safety control device (1) of claim 1, wherein the first and second safety control signals are configured to control the operation of one or more safety systems of the people conveyor (101).

9. The safety control device (1) of claim 1, wherein the first safety control channel (2) is configured to output the first safety control signal in order to control the operation of a first safety switch (44, 52), and the second safety control channel (4) is configured to output the second safety control signal in order to control the operation of a second safety switch (46, 54).

10. The safety control device (1) of claim 9, wherein the first safety control channel (2) comprises a first microcontroller unit (26) configured to output the first safety control signal to a first output circuit (40) configured to control the operation of the first safety switch (44, 52); and wherein the second safety control channel (4) comprises a second microcontroller unit (28) configured to output the second safety control signal to a second output circuit (42) configured to control the operation of the second safety switch (46, 54).

11. The safety control device (1) of claim 9, wherein a safety system of the people conveyor (101) is configured to be activated when one, or both, of the first safety switch (44, 52) and the second safety switch (46, 54) are deactivated in response to the first and second safety control signals respectively.

12. The safety control device (1) of claim 9, wherein the first safety switch (44, 52) and the second safety switch (46, 54) are connected in series and configured such that, when both the first safety switch (44, 52) and the second safety switch (46, 54) are activated, they:

activate an electromagnet (51) configured to prevent mechanical activation of one or more brakes of the people conveyor (101); or activate a drive system (111) of the people conveyor (101), enabling it to impart a driving force or torque to the people conveyor (101) when controlled to do so.

13. The safety control device (1) of claim 1, wherein the people conveyor (101) is an elevator system (101).

14. A method of controlling one or more safety systems of a people conveyor (101), the method comprising:

outputting a first safety control signal by a first safety control channel (2) in response to one or more input signals (10, 12, 14);

outputting a second safety control signal by a second safety control channel (4) in response to one or more input signals (10, 12, 14);

monitoring a health of the first and second safety control channels (2, 4);

determining whether a fault has occurred in either of the first or second safety control channels (2, 4); and overriding the first or second safety control signal in response to a determination that a fault has occurred in the corresponding safety control channel (2, 4), the overriding preventing activation of one or more safety systems.

15. A non-transitory computer readable medium comprising instructions configured to cause a safety control device (1) to operate in accordance with the method of claim 14.

* * * * *